United States Patent
Kobayashi (10) Patent No.: US 12,450,749 B2
(45) Date of Patent: Oct. 21, 2025

(54) IMAGE CAPTURING CONTROL APPARATUS, METHOD, AND NON-TRANSITORY COMPUTER-READABLE STORAGE MEDIUM FOR DETERMINING A FIELD ANGLE

(71) Applicant: CANON KABUSHIKI KAISHA, Tokyo (JP)

(72) Inventor: Hidenori Kobayashi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 351 days.

(21) Appl. No.: 18/298,406

(22) Filed: Apr. 11, 2023

(65) Prior Publication Data
US 2023/0368392 A1  Nov. 16, 2023

(30) Foreign Application Priority Data
May 16, 2022  (JP) ................................. 2022-080351

(51) Int. Cl.
*G06T 7/11* (2017.01)
*G06T 7/174* (2017.01)

(52) U.S. Cl.
CPC ............... *G06T 7/11* (2017.01); *G06T 7/174* (2017.01); *G06T 2207/20021* (2013.01)

(58) Field of Classification Search
None
See application file for complete search history.

(56) References Cited

U.S. PATENT DOCUMENTS

| | | | | |
|---|---|---|---|---|
| 8,478,960 B2* | 7/2013 | Kobayashi | ......... | G06F 12/1441 |
| | | | | 711/163 |
| 10,545,215 B2* | 1/2020 | Karafin | ................ | H04N 23/957 |
| 2016/0295168 A1* | 10/2016 | Rangan | ................... | G09B 5/14 |
| 2019/0079158 A1* | 3/2019 | Karafin | ................. | H04N 23/68 |
| 2023/0368392 A1* | 11/2023 | Kobayashi | ......... | G06V 30/333 |

FOREIGN PATENT DOCUMENTS

| | | |
|---|---|---|
| JP | 5398359 B2 | 1/2014 |
| WO | 2019/087577 A1 | 5/2019 |

* cited by examiner

*Primary Examiner* — Tahmina N Ansari
(74) *Attorney, Agent, or Firm* — Carter, DeLuca & Farrell LLP (57) ABSTRACT

An image capturing control apparatus comprises one or more processors and one or more memories storing executable instructions which, when executed by the one or more processors, cause the apparatus to function as a grouping unit configured to make a determination of, from a frame obtained by capturing a target, whether or not there is continuity between a first description added to an target and a second description already added to the target before the first description, and to group descriptions in the target based on a result of the determination, and a control unit configured to control, based on a time related to each group obtained by the grouping unit, a field angle of an image capturing apparatus such that an image of a description on the target in a group to be delivered in the frame is captured.

14 Claims, 9 Drawing Sheets

| POSITION | ZOOM RANGE | TIME | DESCRIPTION TARGET | DESCRIPTION TARGET POSITION |
|---|---|---|---|---|
| (x1s, y1s), (x1e, y1e) | 0.5 - 1.5 | t1 | b1 | (gx1s, gy1s), (gx1e, gy1e) |
| (x2s, y2s), (x2e, y2e) | 1 | t2 | b2 | (gx2s, gy2s), (gx2e, gy2e) |

IMAGE CAPTURING CONTROL APPARATUS, METHOD, AND NON-TRANSITORY COMPUTER-READABLE STORAGE MEDIUM FOR DETERMINING A FIELD ANGLE

BACKGROUND

Field

The present disclosure relates to an image capturing control technology.

Description of the Related Art

In a place of information sharing such as a lecture, an information sharing board such as a blackboard, a whiteboard, or a screen is generally used to help students understand the lecture. Thus, in the case where an image of the lecture is delivered to students outside a lecture room, it is desirable to include the information expressed on the information sharing board in a delivery image. At this time, if a field angle is too wide, characters included in the delivery image are too small and difficult to read. On the other hand, if the field angle is too narrow, necessary information may not be included in the delivery image, which makes it difficult to understand the lecture. Therefore, it is important to capture an image of the information sharing board at an appropriate field angle.

On the other hand, to save on labor costs, several technologies for determining an appropriate field angle of a delivery image which do not need to be operated by a cameraman have been proposed. In International Publication No. 2019/087577, changes in a feature amount of a predetermined image capturing region are detected to selectively determine a clipping range. In addition, in Japanese Patent No. 5398359, a field angle for a panning control is determined while a zoom magnification at which characters can be read is maintained in accordance with descriptions.

However, there has not been established a method for appropriately controlling a field angle on a case-by-case basis by recognizing the relevance of information on the information sharing board as a cameraman does. Even with the method disclosed in International Publication No. 2019/087577, when a closely related description is written at a position away from a lecturer, it is impossible to simultaneously deliver the image of the description to remote students. Similarly, even with the method disclosed in Japanese Patent No. 5398359, only the region in which the lecturer has written last is an image capturing target, and a continued description written at a distant position is not included in the image capturing target. Thus, if there is no positional continuity between the latest description and a past description, remote students cannot simultaneously refer to these descriptions even though they are closely related.

SUMMARY

The present disclosure provides a technology for determining a field angle that includes descriptions deeply associated with each other on an information sharing board.

According to the first aspect of the present disclosure, there is provided an image capturing control apparatus comprising: one or more processors; and one or more memories storing executable instructions which, when executed by the one or more processors, cause the image capturing control apparatus to function as: a grouping unit configured to make a determination of, from a frame obtained by capturing an image capturing target, whether or not there is continuity between a first description added to an image capturing target and a second description already added to the image capturing target before the first description, and to group descriptions in the image capturing target based on a result of the determination; and a control unit configured to control, based on a time related to each group obtained by the grouping unit, a field angle of an image capturing apparatus such that an image of a description on the image capturing target in a group to be delivered in the frame is captured.

According to the second aspect of the present disclosure, there is provided an image capturing control method performed by an image capturing control apparatus, the method comprising: making a determination of, from a frame obtained by capturing an image capturing target, whether or not there is continuity between a first description added to an image capturing target and a second description already added to the image capturing target before the first description, and grouping descriptions in the image capturing target based on a result of the determination; and controlling, based on a time related to each group obtained by the grouping, a field angle of an image capturing apparatus such that an image of a description on the image capturing target in a group to be delivered in the frame is captured.

According to the third aspect of the present disclosure, there is provided a non-transitory computer-readable storage medium storing a computer program, the computer program causing a computer to function as: a grouping unit configured to make a determination of, from a frame obtained by capturing an image capturing target, whether or not there is continuity between a first description added to an image capturing target and a second description already added to the image capturing target before the first description, and to group descriptions in the image capturing target based on a result of the determination; and a control unit configured to control, based on a time related to each group obtained by the grouping unit, a field angle of an image capturing apparatus such that an image of a description on the image capturing target in a group to be delivered in the frame is captured.

Further features of the present disclosure will become apparent from the following description of exemplary embodiments with reference to the attached drawings.

DESCRIPTION OF THE EMBODIMENTS

Hereinafter, embodiments will be described in detail with reference to the attached drawings. Note, the following embodiments are not intended to limit the scope of the claimed disclosure. Multiple features are described in the embodiments, but limitation is not made to a disclosure that requires all such features, and multiple such features may be combined as appropriate. Furthermore, in the attached drawings, the same reference numerals are given to the same or similar configurations, and redundant description thereof is omitted.

First Embodiment

Figure 1:
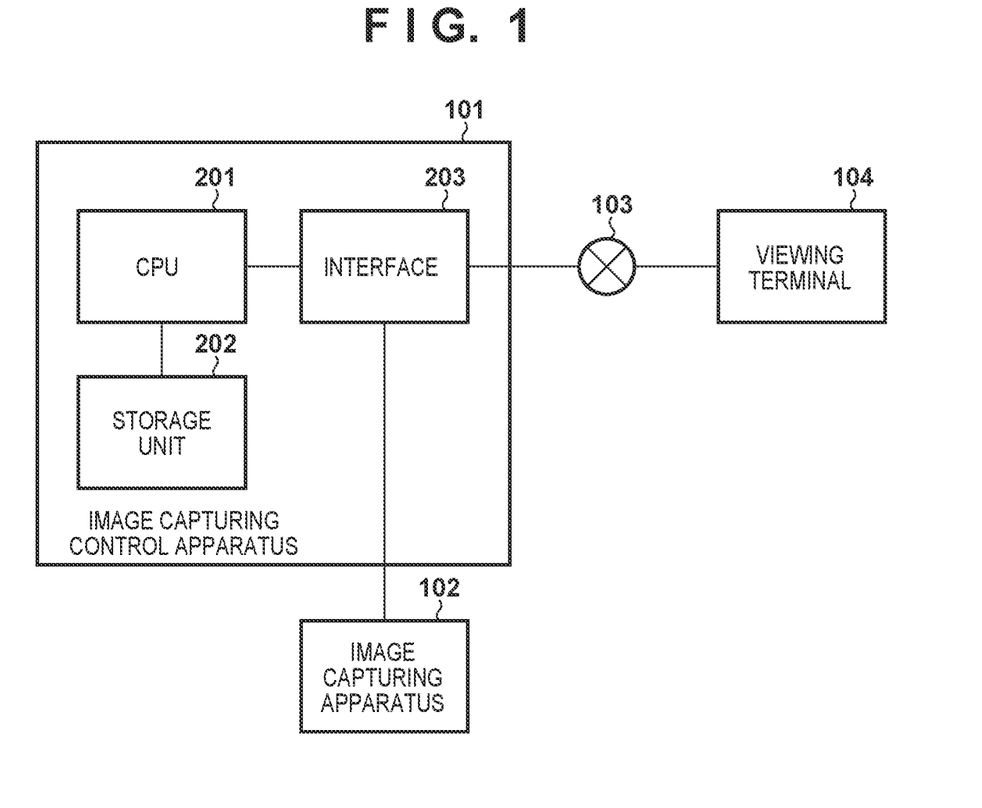
FIG. 1 is a block diagram illustrating a configuration example of a system.

First, a configuration example of a system according to the embodiment will be described, referring to the block diagram of FIG. 1. The system according to the present embodiment is a system that captures a moving image of a scene of performing a lecture using a planar member (hereinafter referred to as an information sharing board) such as a blackboard, a whiteboard, or a screen, and delivers the captured moving image. As illustrated in FIG. 1, the system according to the present embodiment includes an image capturing apparatus 102, an image capturing control apparatus 101, and a viewing terminal 104. The image capturing control apparatus 101 and the viewing terminal 104 are configured to be able to perform data communication with each other via a wired and/or wireless network 103. A network configuration between the image capturing control apparatus 101 and the viewing terminal 104 is not limited to a specific network configuration.

First, the image capturing apparatus 102 will be described. The image capturing apparatus 102 is installed and set in a lecture room installed with information sharing boards such that images of all the information sharing boards in the lecture room can be captured. The image capturing apparatus 102 includes one high-resolution camera, captures a moving image of "a scene of performing a lecture using the information sharing boards" with the high-resolution camera, and sequentially outputs each frame of the captured moving image to the image capturing control apparatus 101. The image capturing apparatus 102 and the image capturing control apparatus 101 may be connected to each other by wire or wirelessly.

Next, the image capturing control apparatus 101 will be described. The image capturing control apparatus 101 determines a range (field angle, angle-of-view, field of view) of a region (low-quality region) to be clipped from each frame (high-resolution frame) received from the image capturing apparatus 102, clips the region of the determined field angle, and generates a delivery frame including the clipped region. In the following description, a zoom factor of a field angle refers to a magnification ratio at which a clipped region is zoomed in or out fitting to a delivery frame. Then, the image capturing control apparatus 101 delivers the generated delivery frame to the viewing terminal 104 via the network 103. Note that, although the following description mentions nothing about a sound, it is assumed that a sound is also included in a frame delivered to the viewing terminal 104 by the image capturing control apparatus 101. However, it is not essential for a frame to include a sound, and a frame may include no sound.

A CPU 201 executes various processes using computer programs and data stored in a storage unit 202. The CPU 201 thus controls the overall operation of the image capturing control apparatus 101, and also executes or controls various processes to be described as being performed by the image capturing control apparatus 101.

The storage unit 202 is a non-volatile memory, and the storage unit 202 stores computer programs and data that cause the CPU 201 to execute or control the various processes to be described as being performed by the image capturing control apparatus 101.

An interface 203 includes an interface configured to connect the image capturing control apparatus 101 to the network 103 and an interface configured to connect the image capturing control apparatus 101 to the image capturing apparatus 102.

Next, the viewing terminal 104 will be described. The viewing terminal 104 displays/plays the delivery frame transmitted from the image capturing control apparatus 101 via the network 103. Accordingly, a student who remotely attends the lecture that is being captured by the image capturing apparatus 102 can view the lecture (video stream) using the viewing terminal 104.

Figure 2:
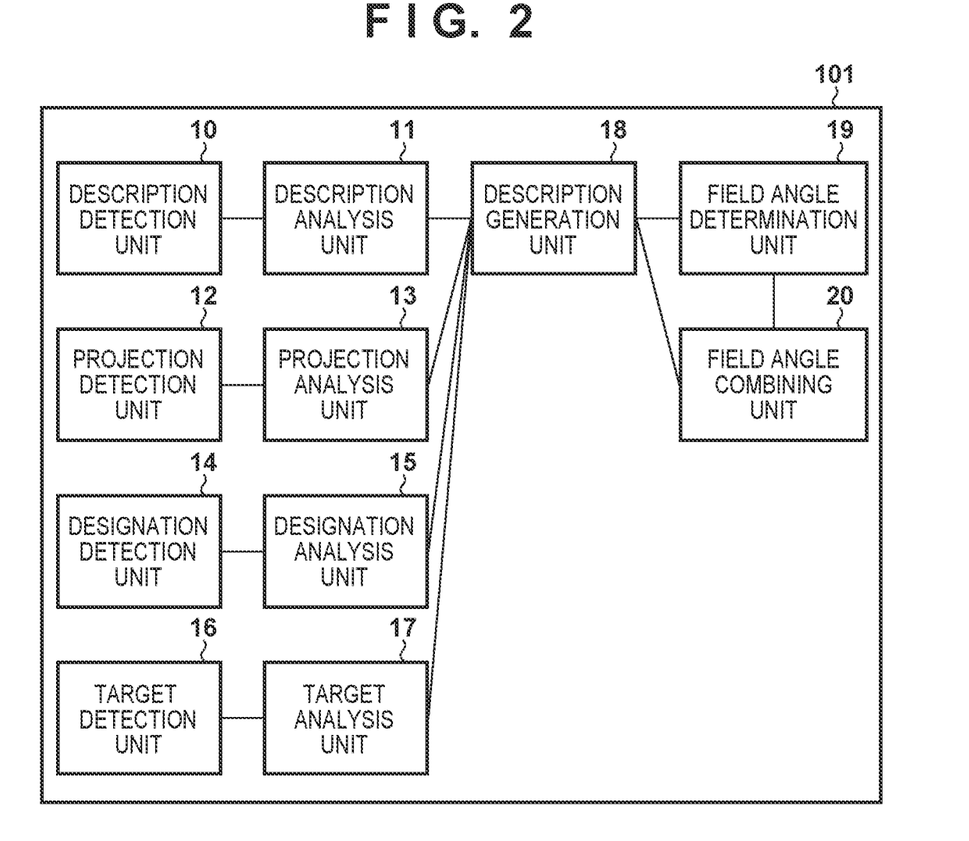
FIG. 2 is a block diagram illustrating a functional configuration example of an image capturing control apparatus 101.

A functional configuration example of the image capturing control apparatus 101 is illustrated in the block diagram of FIG. 2. In the present embodiment, functional units illustrated in FIG. 2 are implemented as computer programs. In the following, the functional units illustrated in FIG. 2 may be described as main entities for processing, but in practice, the CPU 201 executes computer programs corresponding to the functional units, thereby achieving the corresponding functions of the functional units. Note that one or more of the functional units illustrated in FIG. 2 may be implemented by hardware.

Next, a field angle determination process performed by the image capturing control apparatus 101 will be described. The field angle determination process performed by the image capturing control apparatus 101 is broadly classified into a former stage, an intermediate stage, and a latter stage. First, the processes in the former stage and the intermediate stage will be described.

In the process in the former stage, the frame received from the image capturing apparatus 102 is analyzed to generate information to be used for determining a field angle in the process in the latter stage. In the process in the intermediate stage, the information generated by the process in the former stage is stored in the storage unit 202. Along with the execution of the processes in the former stage and the latter stage, stored information is read out and provided for each process as necessary.

"Generation of information" in the process in the former stage can include a grouping process related to descriptions on the information sharing board, a grouping process related to projections on the information sharing board, a time updating process in accordance with designation of a description or a projection on the information sharing board, and a target position recording process and a target position updating process related to the information sharing board. That is, "the generation of information" may include all or part of "the grouping process related to descriptions on the information sharing board, the grouping process related to projections on the information sharing board, the time updating process in accordance with designation of a description or a projection on the information sharing board, the target position recording process and the target position updating process related to the information sharing board". Next, each of the above-described processes that can be included in "the generation of information" will be described.

Grouping Process Related to Descriptions on Information Sharing Board

The grouping process related to descriptions on the information sharing board is a process to be performed in response to a lecturer adding a description to the information sharing board. The grouping process related to descriptions on the information sharing board will be described with reference to the flowchart of FIG. 3.

Figure 3:
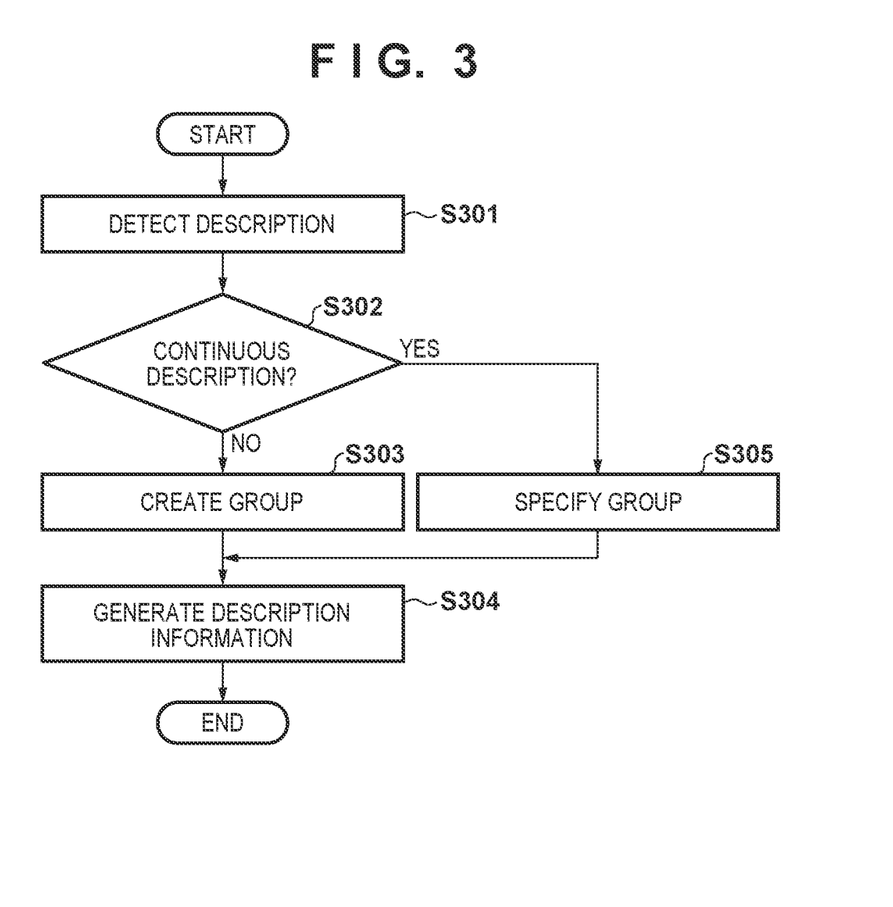
FIG. 3 is a flowchart of a grouping process related to descriptions on an information sharing board.

In step S301, a description detection unit 10 detects a description (a character, a line image, or the like) newly added to the information sharing board in the frame captured by the image capturing apparatus 102. Detection of a description can be performed by a publicly known technology, and for example, a technique based on a background difference using an image and a technique based on character recognition on an image are known.

In step S302, a description analysis unit 11 determines whether or not the description detected in step S301 has continuity with a description that was added to the information sharing board before (in the past) the addition of the description detected in step 301. There are various determination methods for determining whether or not there is continuity between descriptions.

For example, in a case where a difference (time interval) between a detection timing of a newly detected description (description A) and a detection timing of a description (description B) detected in the recent past before the detection of the description A is within a predetermined period of time, it is determined that there is continuity (temporal continuity) between the description A and the description B.

On the other hand, for example, in a case where a distance (spatial distance) between a newly detected description (description A) and a description (description B) detected in the recent past before the detection of the description A is within a predetermined distance, it is determined that there is continuity (spatial continuity) between the description A and the description B.

In other cases, that is, when a predetermined period of time has elapsed between a detection timing of a description A and a detection timing of a description B, or when no description in the past is present within a predetermined distance from a description A, it may be determined that there is no continuity.

Alternatively, for example, continuity between descriptions may be determined in consideration of both the temporal relationship and the spatial relationship between the descriptions. For example, both the time interval described above and the spatial distance described above may be assigned scores, and if the weighted average of the scores exceeds a threshold value, it may be determined that there is continuity.

There may be one index or a plurality of indices for determining whether or not there is continuity between descriptions. As described above, there are various determination methods for determining whether or not there is continuity between descriptions, and the determination method is not limited to a specific determination method.

When it is determined that there is continuity between the description detected in step S301 and a description already present on the information sharing board, the processing proceeds to step S305. On the other hand, when it is determined that there is no continuity between the description detected in step S301 and a description already present on the information sharing board, the processing proceeds to step S303.

In step S303, the description analysis unit 11 creates a new group for the description detected in step S301. When the processing proceeds from step S303 to step S304, in step S304, a description generation unit 18 generates description information of the group created in step S303 based on the description detected in step S301.

On the other hand, in step S305, the description analysis unit 11 specifies a group of the description determined to have continuity with the description detected in step S301. When the processing proceeds from step S305 to step S304, in step S304, the description generation unit 18 updates description information of the group specified in step S305 based on the description detected in step S301 such that the group specified in step 305 includes the description detected in step S301.

Description information generated for each group by the description generation unit 18 includes the position of the group, the allowable zoom range for the group, and the time for the group. The position of a group is position information defining a rectangle (group region) that surrounds and contacts the description included in the group. The position information defining the rectangle may be the positions of the four corners of the rectangle, may be the position of the upper left corner and the position of the lower right corner of the rectangle, or may be the position of the upper left corner of the rectangle and the height and width of the rectangle.

The allowable zoom range for a group is a restriction on a zoom range for including the group in a field angle, and is used to determine the field angle in the latter stage. The time for a group is a logical time and is information by which the generation/update order in groups can be determined. The time for a group may be an actual time at which the group is generated/updated, or may be a time by which an order relationship between groups is determined, such as a counter value counted up when a group is generated/updated.

The allowable zoom range for a group is calculated by the description analysis unit 11 based on the size of a description included in the group. The method of calculating the size of the description varies depending on whether the description includes a character. A known character recognition technology may be used to determine whether or not the description includes a character. When a character is included in the description, the allowable zoom range is calculated based on the size of the character and information about the viewing terminal 104 (such as the resolution of the screen of the viewing terminal 104). The lower limit of the zoom range is set to a zoom factor of zooming out to the maximum extent within a range in which characters can be read on the screen of the viewing terminal 104. The upper limit of the zoom range is set to a zoom factor of zooming in to the maximum extent within a range in which the entire group is accommodated in the screen. On the other hand, when the description includes no character, a predetermined numerical value is used as the allowable zoom range. The predetermined numerical value may be expressed as a range or may be expressed as a stand-alone numerical value. The stand-alone numerical value indicates that the upper limit and the lower limit of the zoom range are equal to each other. In addition, the allowable zoom range may be calculated for each group by using a predetermined function that takes, as an input, a property of each group, for example, the size of a rectangle surrounding the group.

Figure 4:
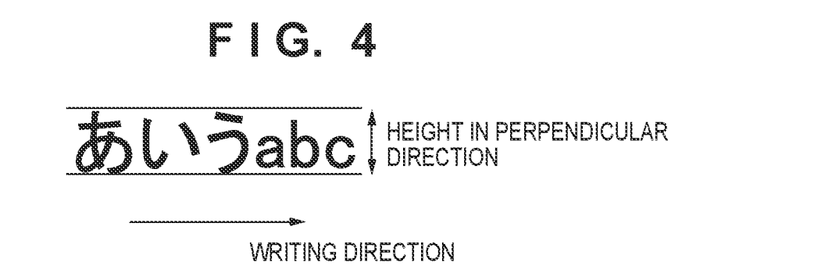
FIG. 4 is a diagram schematically illustrating a method of detecting a size of a character.

In order to detect the size of a character, a lightweight method in which estimation is performed using the height of the character is used. Usually, a writing direction is fixed in a description. For example, in the case of horizontal writing, descriptions are always added in the horizontal direction in one row. The description analysis unit 11 detects a writing direction by using this feature. Then, the maximum value of the height of a continuous stroke group is calculated as the size of the character belonging to the group using a direction orthogonal to the writing direction as an axis. FIG. 4 schematically illustrates a method of detecting the size of a character by the description analysis unit 11. In FIG. 4, since the writing direction is the horizontal direction, the axis in the orthogonal direction is the vertical direction. The tallest character in a vertically-continuous stroke group is the character "あ". Thus, the size of the character included in this description is calculated from the height of "あ".

Grouping Process Related to Projections on Information Sharing Board

The grouping process related to projections on the information sharing board is a process to be performed in response to projection of an image onto the information sharing board from an information device such as a projector. For example, closely related descriptions are assembled page by page in advance, and an information device such as a projector switches an image of a page to be projected by feeding each page, and thereby the image of the page to be projected onto the information sharing board is switched. Thus, a projection region corresponding to the entire page is treated as one group. For the purpose of simplicity, a grouping process is performed by detecting the switching of projection contents as new projection. Since the projection region is a simple rectangle and is brighter than the surroundings, the projection region can be easily detected by a known image processing technology. Similarly, the change of projection contents by page feeding can also be detected by a known image processing technology.

Figure 5:
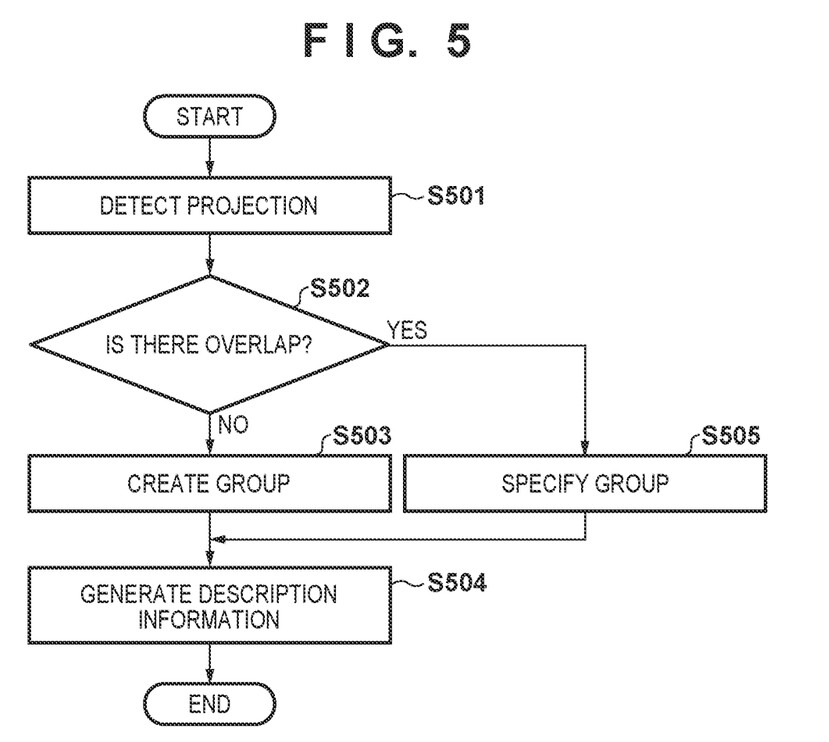
FIG. 5 is a flowchart of a grouping process related to projections on an information sharing board.

The grouping process related to projections on the information sharing board will be described with reference to the flowchart of FIG. 5. In step S501, a projection detection unit 12 detects, in the frame captured by the image capturing apparatus 102, the projection of an image of a page on the information sharing board and the change of projection contents by page feeding.

In step S502, a projection analysis unit 13 detects, in the frame captured by the image capturing apparatus 102, a projection region on the information sharing board on which the image of the page is projected, and determines whether or not there is an overlap between the detected projection region and a group region of an existing group.

As a result of the determination above, when it is determined that there is an overlap, the processing proceeds to step S505. On the other hand, when it is determined that there is no overlap, the processing proceeds to step S503. In the determination of the overlap, even if the entire projection region does not overlap, it may be determined that there is an overlap when a region equal to or greater than a threshold value of the projection region overlaps. Here, as described above, the overlap occurs by page feeding of the projection contents.

In step S505, the projection analysis unit 13 specifies, among existing groups, a group determined to be overlapped with the projection region. Then, when the processing proceeds from step S505 to step S504, in step S504, the description generation unit 18 updates "the position of the group" included in the description information of the group specified in step S505 such that the projection region is included in the group region represented by "the position of the group".

On the other hand, in step S503, the projection analysis unit 13 creates a new group for the projection region detected in step S502. When the processing proceeds from step S503 to step S504, in step S504, the description generation unit 18 generates description information of the group created in step S503 based on the projection region detected in step S502.

Similarly to the description information generated in step S304 described above, the description information generated for each group in step S504 by the description generation unit 18 includes the position of the group, the allowable zoom range for the group, and the time for the group.

The position of a group is position information defining a rectangle (group region) that surrounds and contacts the projection region included in the group. Information of the rectangle represented by the position information is similar to the position of a group related to a description.

The allowable zoom range for a group is a restriction on a zoom range for including the group in a field angle, and is calculated similarly to the method for a group related to a description. That is, in a case where a character is included in the projection region, the zoom range is calculated based on the size of the character. In other cases, a predetermined value is used. The time for a group is a logical time and is information by which the generation/update order in groups can be determined.

Time Updating Process

The time updating process is a process to be performed in response to a lecturer pointing to a description written in the past or a projection region for explanation. The time updating process will be described with reference to the flowchart of FIG. 6.

Figure 6:
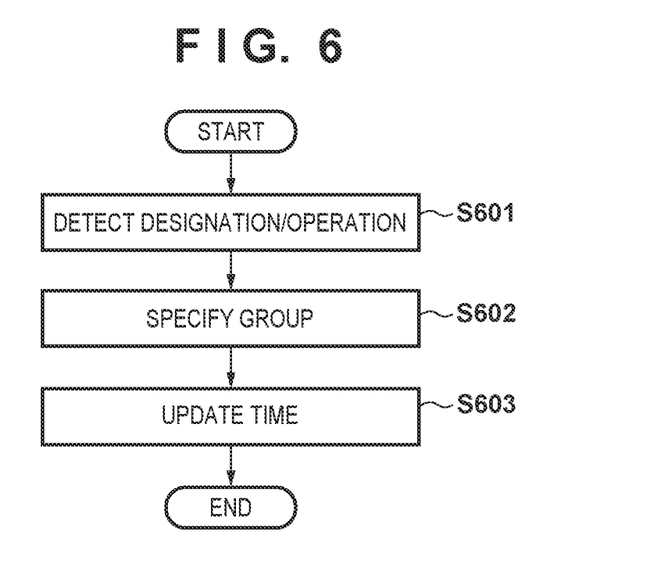
FIG. 6 is a flowchart of a time updating process.

In step S601, a designation detection unit 14 detects an action performed by the lecturer using a frame captured by the image capturing apparatus 102. There are various methods for detecting an action performed by the lecturer.

For example, upon detection of a group region whose distance from the lecturer's hand in the frame is equal to or less than a threshold value, the designation detection unit 14 determines that "the action of the lecturer to point to a group corresponding to the group region by hand" has been performed.

In addition, for example, upon detection of a group region whose distance from a position of an irradiation destination of a laser pointer operated by the lecturer in the frame is equal to or less than a threshold value, the designation detection unit 14 determines that "the action of the lecturer to point to a group corresponding to the group region with the laser pointer" has been performed. The same applies to a case where the lecturer points to a projection region using a laser pointer. In addition to the above, when a target to be pointed using a laser pointer by the lecturer is a projection region, the target may be pointed by an operation of an information processing apparatus using a mouse pointer or the like. In that case, the operation of the information processing apparatus by the lecturer is detected and treated as the designation of the projection region. In order to improve a detection accuracy, a speech of the lecturer may be recognized and the content of the speech may be added to determination factor.

In step S602, a designation analysis unit 15 specifies a group determined to be pointed by the lecturer in the processing in step S601. In step S603, the description generation unit 18 updates the time included in the description information of the group specified in step S602. In updating the time included in the description information, for example, when the actual time is used as the time, the time is updated to the current time (designation time).

Target Position Recording Process and Target Position Updating Process

The target position recording process and the target position updating process related to the information sharing board are processes for efficiently updating the position of a description or a projection when a blackboard as the information sharing board is vertically slidable or when a whiteboard as the information sharing board is movable. First, in the target position recording process, the position of the information sharing board at the starting point in time of image capturing by the image capturing apparatus 102 is recorded. Then, in the target position updating process, the recorded position of the information sharing board is updated depending on changes in the position of the information sharing board during the image capturing by the image capturing apparatus 102.

Figure 7:
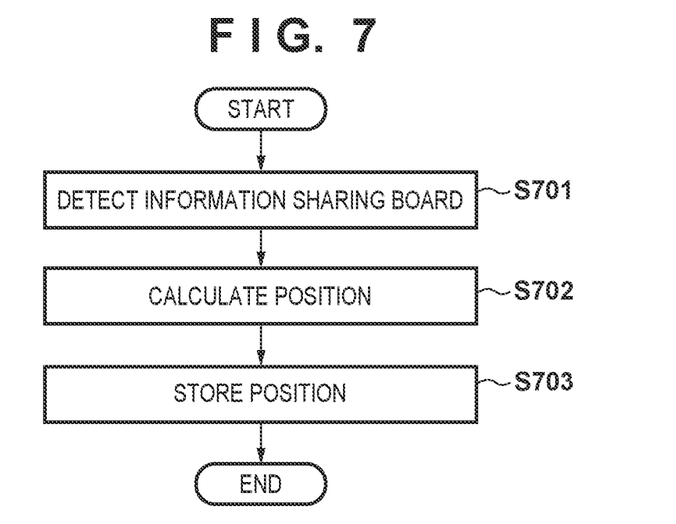
FIG. 7 is a flowchart of a target position recording process.

First, the target position recording process for recording the initial position of the information sharing board (the position of the information sharing board at the starting point in time of the image capturing by the image capturing apparatus 102) in the storage unit 202 will be described with reference to the flowchart of FIG. 7. In step S701, a target detection unit 16 detects the information sharing board in a frame captured by the image capturing apparatus 102.

In step S702, a target analysis unit 17 detects the position of the information sharing board detected in step S701. For example, the target analysis unit 17 acquires a position obtained by converting the position of the information sharing board detected from the frame in step S701 (positions of four corners of the information sharing board, positions of two corresponding corners of the information sharing board, or the like) into a position in a world coordinate system in the lecture room. The world coordinate system in the lecture room is a coordinate system in which one point in the lecture room is set as an origin, and three axes orthogonal to each other at the origin are set as an x-axis, a y-axis, and a z-axis, respectively. In the present embodiment, it is assumed that the position and the orientation of the image capturing apparatus 102 in the world coordinate system in the lecture room are acquired and stored in the storage unit 202 as position and orientation information in advance. Thus, the target analysis unit 17 acquires a position, which is obtained by converting the position of the information sharing board in the frame captured by the image capturing apparatus 102 through known coordinate conversion using the position and orientation information, as "the position in the world coordinate system in the lecture room".

In step S703, the description generation unit 18 generates position information defining a rectangle that surrounds and contacts a region of the information sharing board defined by the position acquired in step S702. The position information defining the rectangle may be the positions of the four corners of the rectangle, may be the position of the upper left corner and the position of the lower right corner of the rectangle, or may be the position of the upper left corner of the rectangle and the height and width of the rectangle. Then, the description generation unit 18 stores the generated position information as "the initial position of the information sharing board" in the storage unit 202.

Figure 8:
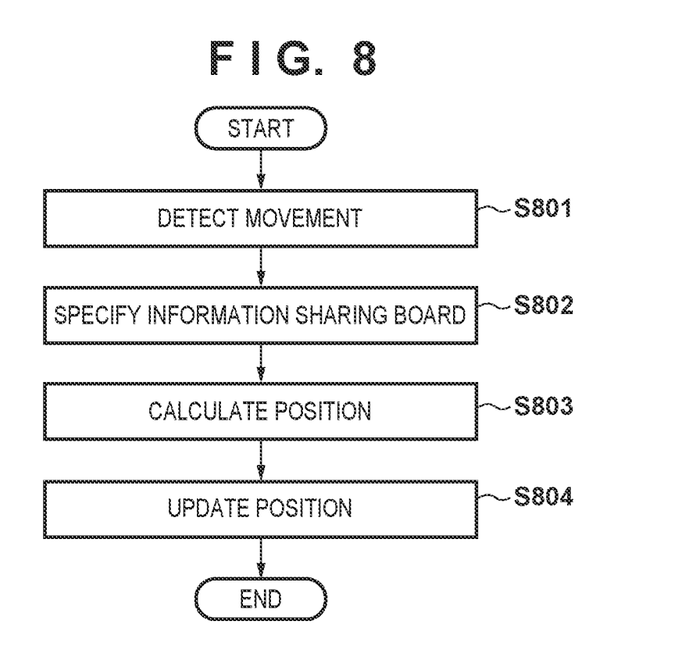
FIG. 8 is a flowchart of a target position updating process.

Next, the target position updating process for updating the position of the information sharing board will be described with reference to the flowchart of FIG. 8. In step S801, the target detection unit 16 detects the movement of the information sharing board in the frame captured by the image capturing apparatus 102. In step S802, the target analysis unit 17 specifies which information sharing board has moved.

In step S803, the description generation unit 18 acquires the current position of the information sharing board (the information sharing board specified in step S802) in the world coordinate system detected in the frame captured by the image capturing apparatus 102 as described above. In step S804, the description generation unit 18 stores the position of "the moved information sharing board" in the world coordinate system acquired in step S803 in the storage unit 202.

Figure 9:
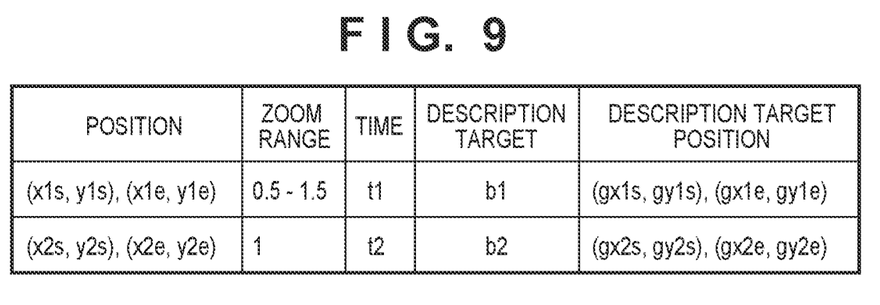
FIG. 9 is a diagram illustrating a configuration example of description information.

Here, a configuration example of description information is illustrated in FIG. 9. FIG. 9 illustrates a configuration of description information for each group, and each row corresponds to description information of a corresponding group. In FIG. 9, the description information includes the position of a group, the allowable zoom range for the group, the time for the group, a description target, and a description target position.

The position of a group in FIG. 9 is position information indicating the positions of the upper left corner and the lower right corner of a rectangle that surrounds and contacts the description included in the group in a local coordinate system set relative to the information sharing board as a reference point. The local coordinate system set relative to the information sharing board as a reference point is, for example, a coordinate system in which one point on the information sharing board is set as an origin, an axis along one side of the information sharing board is set as an x-axis, and an axis along an orthogonal side orthogonal to the one side of the information sharing board is set as a y-axis.

The allowable zoom range for a group is a restriction on the zoom range for including the group in a field angle. The allowable zoom range for a group including a character includes an upper limit value and a lower limit value of a zoom range within which a viewer of the viewing terminal 104 can read the character, and the allowable zoom range for a group not including a character is a predetermined zoom factor. The time for a group is a logical time as described above. The description target is an identifier unique to each information sharing board.

The description target position is the position of an upper left corner and the position of a lower right corner of the information sharing board in the world coordinate system in the lecture room. Although it is more efficient to separately manage the description target position, it is inclusively described here for convenience of explanation. The configuration of description information is not limited to a specific configuration, and for example, the information group illustrated in FIG. 9 may be divided into two groups and managed. In addition, apparatuses that retain the respective information described above are not limited to specific apparatuses as long as the image capturing control apparatus 101 can acquire the respective information as necessary.

Figure 10A:
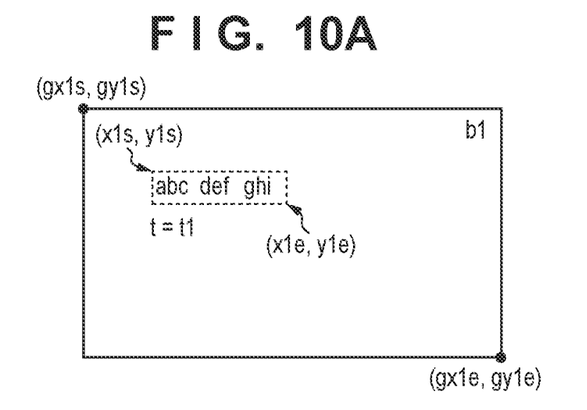
FIG. 10A is a diagram illustrating a content represented by the description information of FIG. 9.

FIG. 10A illustrates the contents represented by the description information of the group corresponding to the first row in FIG. 9 (referred to as the group A). In the world coordinate system in the lecture room, the positions of the upper left corner and the lower right corner of the information sharing board to which an identifier b1 is assigned (information sharing board b1) are (gx1s, gy1s) and (gx1e, gy1e), respectively, and the group A is on the information sharing board b1. The group A includes a character string "abc def ghi" as a description, and the positions of the upper left corner and the lower right corner of a rectangle that surrounds and contacts the character string are (x1s, y1s) and (x1e, y1e), respectively. The latest generation time/update time/designation time of the group A is t1. The upper limit value of the zoom range for the character string belonging to the group A is 1.5, and the lower limit value is 0.5.

Figure 10B:
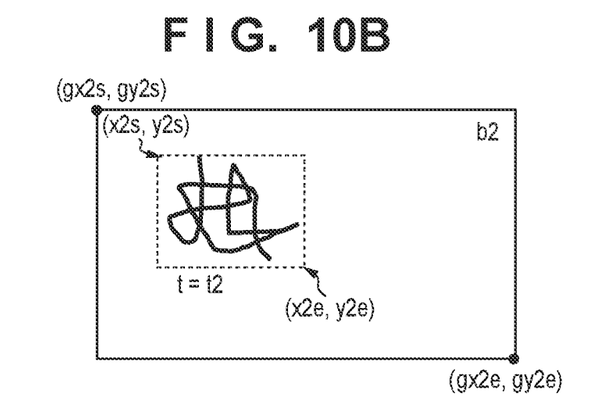
FIG. 10B is a diagram illustrating a content represented by the description information of FIG. 9.

FIG. 10B illustrates the contents represented by the description information of the group corresponding to the second row in FIG. 9 (referred to as the group B). In the world coordinate system in the lecture room, the positions of the upper left corner and the lower right corner of the information sharing board to which an identifier b2 is assigned (information sharing board b2) are (gx2s, gy2s) and (gx2e, gy2e), respectively, and the group B is on the information sharing board b2. The group B includes a line image as a description, and the positions of the upper left corner and the lower right corner of a rectangle that surrounds and contacts the line image are (x2s, y2s) and (x2e, y2e), respectively. The latest generation time/update time/ designation time of the group B is t2. The zoom range for the line image belonging to the group B is 1.

Processing in Latter Stage

Next, the processing in the latter stage will be described. The processing in the latter stage can include a field angle determination process and a field angle combining process.

Field Angle Determination Process

A field angle determination process according to the present embodiment will be described with reference to the flowchart of FIG. 11. In step S1101, a field angle determination unit 19 refers to the description information of each group, and acquires description information including the latest time among the description information of groups not included in the currently set field angle (set field angle) in the frame captured by the image capturing apparatus 102. The initial value of the set field angle is an appropriate initial value, and there may be a case where no group is included depending on the initial value.

In step S1102, the field angle determination unit 19 updates the set field angle such that the group corresponding to the description information acquired in step S1101 is included in the set field angle. That is, the field angle determination unit 19 updates the set field angle such that the position of the group included in the description information acquired in step S1101 is included in the set field angle. In other words, in the present embodiment, the group having the latest time is preferentially included in the set field angle.

In step S1103, the field angle determination unit 19 determines whether or not the zoom factor according to the set field angle falls within the allowable zoom range included in the description information of each group that is included in the set field angle.

As a result of the determination above, when the zoom factor according to the set field angle falls within the allowable zoom range included in the description information of each group that is included in the set field angle, the processing proceeds to step S1101. On the other hand, when the zoom factor according to the set field angle does not fall within the allowable zoom range included in the description information of at least one of groups that are included in the set field angle, the processing proceeds to step S1104. In step S1104, the field angle determination unit 19 returns (restore) the set field angle to the set field angle before the update in step S1102.

Figure 11:
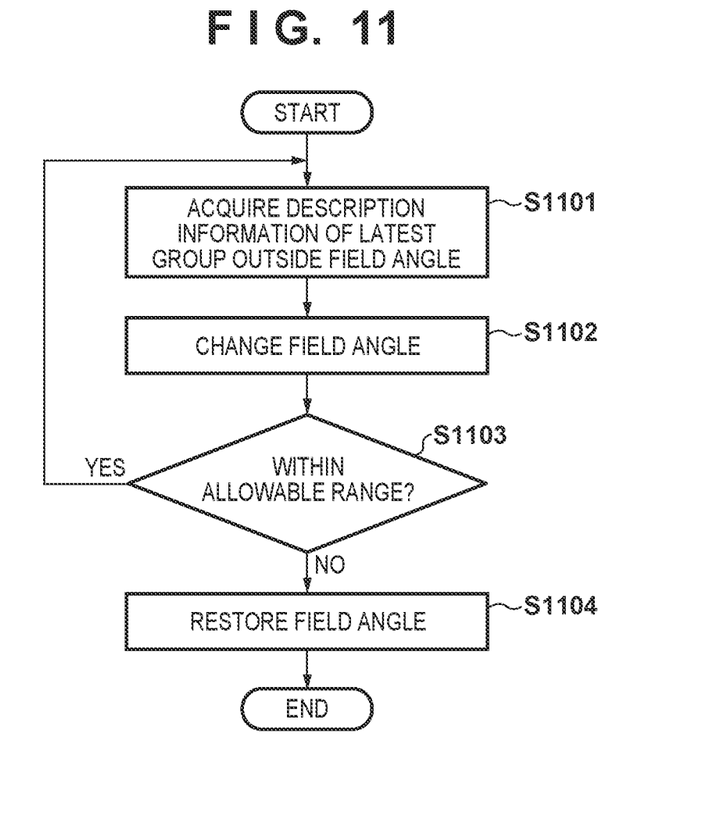
FIG. 11 is a flowchart of a field angle determination process.

Note that the image capturing control apparatus 101 may clip an image in the set field angle determined by the processing according to the flowchart of FIG. 11 from the frame captured by the image capturing apparatus 102 and deliver the clipped image to the viewing terminal 104 as a delivery frame. The image clipped from the frame may be resized to an appropriate size (for example, the size of a delivery frame) as necessary and then delivered to the viewing terminal 104 as the delivery frame.

Field Angle Combining Process

A field angle combining process is a process of setting new field angles for closely related descriptions that are separated from each other and cannot be accommodated in one field angle, and combining a plurality of field angles including the set field angles to create a delivery frame. At this time, the similar field angle determination process as described above is executed for each of field angles already combined. A field angle combining process according to the present embodiment will be described with reference to the flowchart of FIG. 12.

Figure 12:
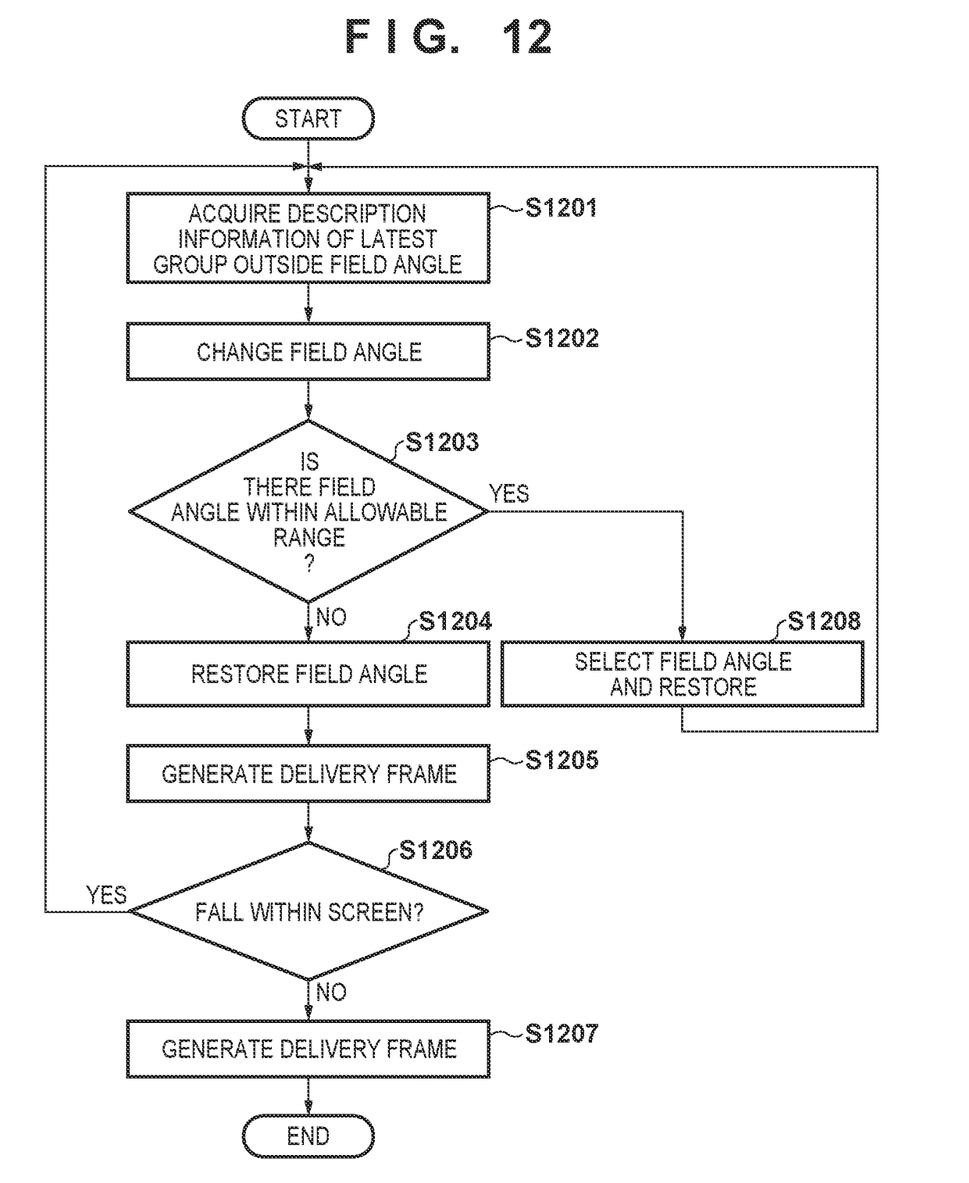
FIG. 12 is a flowchart of a field angle combining process.

In step S1201, the field angle determination unit 19 refers to the description information of each group, and acquires description information including the latest time among the description information of groups not yet included in combined field angles in the frame captured by the image capturing apparatus 102.

In step S1202, the field angle determination unit 19 changes the combined field angles (all or a part of the combined field angles) such that the combined field angles and the field angle of the group of the description information acquired in step S1201 are accommodated in a field angle to be transmitted (for example, a delivery frame).

In step S1203, the field angle determination unit 19 determines whether or not at least one of the combined field angles changed satisfies that "the zoom factor according to the field angle after the change falls within the allowable zoom range". As a result of the determination above, when at least one of the combined field angles changed satisfies that "the zoom factor according to the field angle after the change falls within the allowable zoom range", the processing proceeds to step S1208. On the other hand, when none of the combined field angles changed satisfies that "the zoom factor according to the field angle after the change falls within the allowable zoom range", the processing proceeds to step S1204.

In step S1208, the field angle determination unit 19 selects, among the combined field angles changed, a field angle satisfying that "the zoom factor according to the field angle after the change falls within the allowable zoom range" as a selected field angle. Then, the field angle determination unit 19 returns field angles other than the selected field angle among the combined field angles to the field angles before the change. Accordingly, the field angle of the group of the description information acquired in step S1201 is included in the combined field angles. On the other hand, in step S1204, the field angle determination unit 19 returns the field angles changed in the latest step S1202 to the original field angles.

In step S1205, a field angle combining unit 20 generates, as a delivery frame, a frame in which partial images in respective field angles included in the combined field angles are arranged such that the positional relationship between the partial images in the respective field angles is maintained in at least one of the horizontal direction and the vertical direction.

Figure 13A:
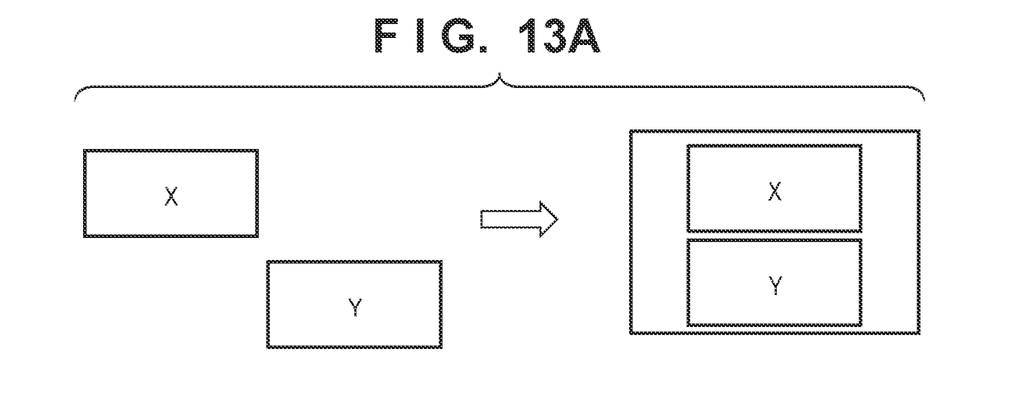
FIG. 13A is a diagram for explaining the field angle combining process.

For example, as illustrated on the left side in FIG. 13A, it is assumed that a partial image X is located on the upper left side of a partial image Y in the frame captured by the image capturing apparatus 102. In this case, as illustrated on the right side in FIG. 13A, a delivery frame is generated by arranging the partial image X and the partial image Y such that the positional relationship between the partial image X and the partial image Y in the vertical direction is maintained.

Figure 13B:
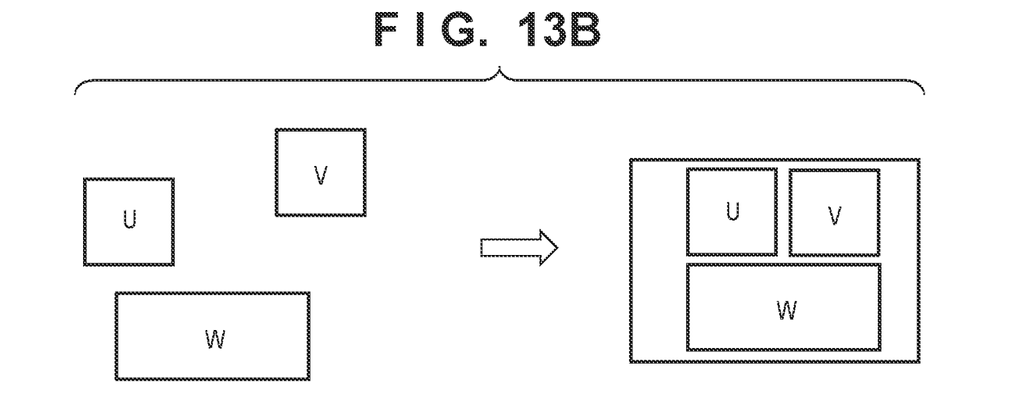
FIG. 13B is a diagram for explaining the field angle combining process.

Also, for example, as illustrated on the left side in FIG. 13B, it is assumed that a partial image U is located on the lower left side of a partial image V and on the upper left side of a partial image W, and the partial image V is located on the upper right side of the partial image W in the frame captured by the image capturing apparatus 102. In this case, as illustrated on the right side in FIG. 13B, a delivery frame is generated by arranging the partial image U, the partial image V, and the partial image W such that the positional relationship between the partial image U and the partial image V in the horizontal direction is maintained and the positional relationship between the partial image U/partial images V and the partial image W in the vertical direction is maintained.

In step S1206, the field angle combining unit 20 determines whether or not image portions in the respective field angles included in the combined field angles are included without deficiency in the delivery frame generated in step S1205.

As a result of the determination above, when it is determined that the image portions in the respective field angles included in the combined field angles are included without deficiency in the delivery frame generated in step S1205, the processing proceeds to step S1201.

On the other hand, when it is not determined that the image portions in the respective field angles included in the combined field angles are included without deficiency in the delivery frame generated in step S1205, the processing proceeds to step S1207.

In step S1207, the field angle combining unit 20 generates the delivery frame generated in the previous step S1205, that is, a delivery frame before the lastly arranged "image portions of the field angle of the group of the description information acquired in step S1201" are arranged.

As described above, according to the present embodiment, it is possible to group pieces of information described on the information sharing board and determine a field angle for simultaneously delivering closely related pieces of information in accordance with a priority order based on a generation time, an update time, a designation time, or the like of the group.

Second Embodiment

In the following embodiments including the present embodiment, the difference from the first embodiment will be described, assuming that the following embodiments are similar to the first embodiment unless otherwise specified. In the present embodiment, a case will be described in which the image capturing apparatus 102 includes a camera (PTZ camera) that can control panning, tilting, and zooming. When a PTZ camera is used, a field angle to be controlled is the image-pickup field angle of the PTZ camera itself, and the field angle is changed by controlling panning, tilting, and zooming. The zoom factor of the field angle corresponds to the zoom factor of the PTZ camera.

In the present embodiment, a field angle determined by the processing according to the first embodiment is notified to the image capturing apparatus 102. In the first embodiment, the change of a field angle is implemented only by the image capturing control apparatus 101. However, in the present embodiment, the change of a field angle requires the control of the PTZ camera included in the image capturing apparatus 102. Thus, upon determining a new field angle, the field angle determination unit 19 outputs the determined field angle to the image capturing apparatus 102 via the interface 203 as settings related to panning, tilting, and zooming.

Note that it is not necessary to transmit field angle candidates generated during the field angle determination process to the image capturing apparatus 102 each time. By including a logical model of the PTZ camera, the image capturing control apparatus 101 can calculate a zoom factor after the change of a field angle by simulation. Thus, it is possible to determine whether or not the zoom factor falls within the allowable zoom range in step S1103 without changing the actual field angle of the camera.

In this manner, the present embodiment can be applied to the image capturing apparatus 102 including one or more PTZ cameras. Accordingly, the similar effect as that of the first embodiment can be obtained.

Third Embodiment

In the configuration in FIG. 1, the image capturing apparatus 102 and the image capturing control apparatus 101 are described as separate apparatuses. However, the image capturing apparatus 102 and the image capturing control apparatus 101 may be configured to be integrated, that is, for example, the image capturing apparatus 102 may be configured to include the image capturing control apparatus 101.

In the configuration of FIG. 1, the image capturing control apparatus 101 and the viewing terminal 104 are described as being connected to each other via the network 103. However, for the purpose of securing scalability or the like, a delivery server may be provided on the network 103, and the server may deliver a delivery frame generated by the image capturing control apparatus 101 to the viewing terminal 104.

In the second embodiment, video streams from a plurality of PTZ cameras are used without being processed. However, if frames captured by the PTZ cameras have sufficiently high resolution, the method of the first embodiment may be used in combination. That is, images clipped from the video streams from the PTZ cameras may be combined with a delivery image.

Further, the viewing terminal 104 may be caused to execute a part of the processing described above as being performed by the image capturing control apparatus 101. For example, when there is a variation in the resolution or the size of the screen of the viewing terminal 104, the viewing terminal 104 may execute the above-described field angle determination process to adjust the allowable zoom range suiting the viewing terminal 104. In addition, in the case of enabling field angle selection by a student only on the viewing terminal 104 having a certain resolution or higher, the field angle determination process may be repeated on the viewing terminal 104 to generate a plurality of field angles and set them as selection candidates.

Alternatively, the numerical values, processing timings, processing orders, processing entities, and data (information) transmission destinations/transmission sources/storage locations, and the like used in the embodiments described above are referred to for specific description as an example, and are not intended for limitation to these examples.

Alternatively, some or all of the embodiments described above may be used in combination as appropriate. Alternatively, some or all of the embodiments described above may be selectively used.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-080351, filed May 16, 2022, which is hereby incorporated by reference herein in its entirety.

What is claimed is:

1. An image capturing control apparatus comprising:
one or more processors; and
one or more memories storing executable instructions which, when executed by the one or more processors, cause the image capturing control apparatus to:
  detect a first description which is newly added to an image capturing target based on user operation from a frame obtained by capturing an image capturing target using an image capturing apparatus;
  determine whether or not there is continuity between the first description and a second description already added to the image capturing target before the first description;
  in a case where it is determined that there is continuity between the first description and the second description, specify a group including the second description from one or more group including one or more description present on the image capturing target, and generate description information which defines a target group which includes the first description and descriptions included in the specified group including the second description; and
  control, based on the description information, an angle of a field of the image capturing apparatus such that descriptions included in the target group is captured.

2. The image capturing control apparatus according to claim 1, wherein the instructions, when executed by the one or more processors, further cause the image capturing control apparatus to:
  determine whether or not there is spatial and/or temporal continuity between the first description and the second description.

3. The image capturing control apparatus according to claim 1, wherein the instructions, when executed by the one or more processors, further cause the image capturing control apparatus to:
  in a case where it is determined that there is no continuity between the first description and the second description, generate description information which defines a new group corresponding to the first description.

4. The image capturing control apparatus according to claim 1, wherein the instructions, when executed by the one or more processors, further cause the image capturing control apparatus to:
  determine whether or not there is an overlap between a projection region of a page projected on the image capturing target and a region of an existing group from the frame; and
  in a case where it is determined that there is an overlap between the projection region and the region of the existing group, specify the existing group from one or more group including one or more description present on the image capturing target, and generate description information which defines a region which includes the region of the existing group and the projection region.

5. The image capturing control apparatus according to claim 4, wherein the instructions, when executed by the one or more processors, further cause the image capturing control apparatus to:
  in case where it is determined that there is no overlap between the projection region and the region of the existing group, generate description information which defines a new group corresponding to the projection region.

6. The image capturing control apparatus according to claim 1, wherein the instructions, when executed by the one or more processors, further cause the image capturing control apparatus to detect a movement of the image capturing target and acquire a position of the image capturing target.

7. The image capturing control apparatus according to claim 1, wherein the instructions, when executed by the one or more processors, further cause the image capturing control apparatus to:
  update the angle of the field such that the description included in each group in order from a group whose generation time is a latest time is captured; and
  perform the update until a zoom factor according to the angle of the field no longer falls within an allowable zoom range indicated by description information of each group included in the angle of the field.

8. The image capturing control apparatus according to claim 7, wherein the executable instructions, when executed by the one or more processors, further cause the image capturing control apparatus to:

determine an allowable zoom range of a group including a character in accordance with a size of the character.

9. The image capturing control apparatus according to claim 1, wherein the instructions, when executed by the one or more processors, further cause the image capturing control apparatus to generate, as a delivery frame, a frame obtained by arranging partial images in respective angles of fields included in the angle of the field such that a positional relationship between the partial images in the respective angles of fields is maintained in at least one of a horizontal direction and a vertical direction.

10. The image capturing control apparatus according to claim 1, wherein the image capturing apparatus is an image capturing apparatus including a camera that can control panning, tilting, and zooming.

11. The image capturing control apparatus according to claim 1, wherein the description information includes a generation time of the group, an update time for the group, and a designation time for the group.

12. The image capturing control apparatus according to claim 1, wherein the image capturing target includes a blackboard and a screen.

13. An image capturing control method performed by an image capturing control apparatus, the method comprising:
  detecting a first description which is newly added to an image capturing target based on user operation from a frame obtained by capturing an image capturing target using an image capturing apparatus;
  determining whether or not there is continuity between the first description and a second description already added to the image capturing target before the first description;
  in a case where it is determined that there is continuity between the first description and the second description, specifying a group including the second description from one or more group including one or more description present on the image capturing target, and generating description information which defines a target group which includes the first description and descriptions included in the specified group including the second description; and
  controlling, based on the description information, an angle of a field of the image capturing apparatus such that descriptions included in the target group is captured.

14. A non-transitory computer-readable storage medium storing a computer program, the computer program being configured to cause an image capturing control apparatus to execute an image capturing control method comprising:
  detecting a first description which is newly added to an image capturing target based on user operation from a frame obtained by capturing an image capturing target using an image capturing apparatus;
  determining whether or not there is continuity between the first description and a second description already added to the image capturing target before the first description;
  in a case where it is determined that there is continuity between the first description and the second description, specifying a group including the second description from one or more group including one or more description present on the image capturing target, and generating description information which defines a target group which includes the first description and descriptions included in the specified group including the second description; and
  controlling, based on the description information, an angle of a field of the image capturing apparatus such that descriptions included in the target group is captured.

* * * * *